US010558641B2

(12) United States Patent
Moysi et al.

(10) Patent No.: US 10,558,641 B2
(45) Date of Patent: Feb. 11, 2020

(54) TRIGGER SYSTEM FOR DATABASES USING PROXY

(71) Applicant: Microsoft Technology Licensing, LLC, Redmond, WA (US)

(72) Inventors: Liran Moysi, Ramat Gan (IL); Aviram Cohen, Yafo (IL); Noam Liran, Yafo (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 304 days.

(21) Appl. No.: 15/493,561

(22) Filed: Apr. 21, 2017

(65) Prior Publication Data
US 2018/0307717 A1 Oct. 25, 2018

(51) Int. Cl.
*G06F 16/23* (2019.01)
*H04L 29/08* (2006.01)

(52) U.S. Cl.
CPC ............ *G06F 16/235* (2019.01); *H04L 67/28* (2013.01)

(58) Field of Classification Search
CPC ............................... G06F 16/235; H04L 67/28
USPC .......................................................... 707/609
See application file for complete search history.

(56) References Cited

U.S. PATENT DOCUMENTS

| 5,781,703 | A  | * | 7/1998  | Desai .................. G06F 11/3495 706/50 |
| 6,405,212 | B1 | * | 6/2002  | Samu ...................... G06F 16/21 |
| 6,587,854 | B1 |   | 7/2003  | Guthrie et al. |
| 6,594,656 | B1 |   | 7/2003  | Arlein et al. |
| 7,921,299 | B1 |   | 4/2011  | Anantha et al. |
| 8,260,964 | B2 |   | 9/2012  | Marmor |
| 8,291,490 | B1 |   | 10/2012 | Ahmed et al. |
| 8,365,270 | B2 |   | 1/2013  | Webb-Johnson |
| 8,473,594 | B2 |   | 6/2013  | Astete et al. |
| 8,799,320 | B2 |   | 8/2014  | Chan et al. |
| 8,849,793 | B2 |   | 9/2014  | Vexler |
| 9,081,805 | B1 |   | 7/2015  | Stamen et al. |
| 9,081,835 | B2 |   | 7/2015  | Hind et al. |

(Continued)

FOREIGN PATENT DOCUMENTS

| CN | 102682044 A | 9/2012 |
| WO | 2000051031 A1 | 8/2000 |
| WO | 2009055543 A1 | 4/2009 |

OTHER PUBLICATIONS

Hjertström, Andreas, et al., "Data management for component-based embedded real-time systems: The database proxy approach", The Journal of Systems and Software, vol. 85, Issue 4, Apr. 2012, pp. 821-834.*

(Continued)

*Primary Examiner* — Robert Stevens
(74) *Attorney, Agent, or Firm* — Workman Nydegger

(57) ABSTRACT

A proxy module for monitoring modifications to a database and external to the database includes a query processing module to monitor traffic to and from the database. The traffic includes queries to the database. The query processing module is further to identify a query corresponding to a request to modify the database. A trigger event module is to generate a trigger event based on the request. The trigger event indicates a modification of the database associated with the request. The trigger event module is further to cause the trigger event to be communicated from the proxy module to at least one entity accessing the database.

20 Claims, 4 Drawing Sheets

(56) References Cited

U.S. PATENT DOCUMENTS

| | | | |
|---|---|---|---|
| 9,276,942 | B2 | 3/2016 | Srinivasan et al. |
| 10,305,861 | B2 | 5/2019 | Moysi et al. |
| 2004/0226030 | A1* | 11/2004 | Marvin ............... G06F 8/41 719/328 |
| 2006/0053164 | A1* | 3/2006 | Ewing ............... H04L 67/125 |
| 2009/0113031 | A1 | 4/2009 | Ruan et al. |
| 2009/0254572 | A1 | 10/2009 | Redlich et al. |
| 2010/0174939 | A1* | 7/2010 | Vexler ............ G06F 16/24552 714/5.1 |
| 2011/0161656 | A1 | 6/2011 | Rao |
| 2011/0270886 | A1 | 11/2011 | An et al. |
| 2012/0246696 | A1 | 9/2012 | Boukobza |
| 2012/0304189 | A1 | 11/2012 | Tominaga et al. |
| 2013/0018919 | A1* | 1/2013 | Peek ............ G06F 16/24549 707/780 |
| 2013/0018988 | A1 | 1/2013 | Peek |
| 2013/0124475 | A1 | 5/2013 | Hildenbrand et al. |
| 2013/0133059 | A1 | 5/2013 | Maman et al. |
| 2013/0174242 | A1 | 7/2013 | Snow et al. |
| 2013/0198154 | A1* | 8/2013 | Welborn ............ G06F 16/235 707/695 |
| 2014/0032228 | A1 | 1/2014 | Johri et al. |
| 2014/0130175 | A1 | 5/2014 | Ramakrishnan |
| 2014/0280492 | A1 | 9/2014 | Yang et al. |
| 2014/0331337 | A1 | 11/2014 | Factor et al. |
| 2015/0120697 | A1* | 4/2015 | Asner ............ G06F 16/2282 707/714 |
| 2015/0135302 | A1 | 5/2015 | Cohen et al. |
| 2015/0169648 | A1* | 6/2015 | Foebel ............ H04L 67/02 707/609 |
| 2016/0004716 | A1 | 1/2016 | Akirav et al. |
| 2016/0094486 | A1 | 3/2016 | Sahoo et al. |
| 2016/0142506 | A1 | 5/2016 | Sahoo et al. |
| 2017/0142068 | A1 | 5/2017 | Devarajan et al. |
| 2017/0177698 | A1 | 6/2017 | Lee et al. |
| 2017/0293619 | A1* | 10/2017 | Dubey ............ G06F 16/211 |
| 2017/0295236 | A1* | 10/2017 | Kulkarni ............ H04L 67/1097 |
| 2018/0063089 | A1 | 3/2018 | Moysi et al. |
| 2018/0137146 | A1* | 5/2018 | Mayer ............ G06F 8/433 |
| 2019/0319929 | A1 | 10/2019 | Moysi et al. |

OTHER PUBLICATIONS

Hecht, Geoffrey, et al., "An Empirical Study of the Impact of Cloud Patterns on Quality of Service (QoS)", CloudCom 2014, Singapore, Singapore, Dec. 15-18, 2014, pp. 278-283.*

Zhao, Liang, et al., "An Architecture Framework for Application-Managed Scaling of Cloud-Hosted Relational Databases", WICSA/ECSA 2012, Helsinki, Finland, Aug. 20-24, 2012, pp. 21-28.*

Strauch, Steve, et al., "Non-Functional Data Layer Patterns for Cloud Applications", CloudCom 2012, Taipei, Taiwan, Dec. 3-6, 2012, pp. 601-605.*

"Non Final Office Action Issued in U.S. Appl. No. 15/249,554", dated May 3, 2018, 16 Pages.

Hingwe, et al., "Hierarchical Role-Based Access Control with Homomorphic Encryption for Database as a Service", In Proceedings of International Conference on ICT for Sustainable Development, Feb. 26, 2016, 11 Pages.

"International Search Report and Written Opinion Issued in PCT Application No. PCT/US2017/047874", dated Nov. 3, 2017, 15 Pages.

Schiller, et al., "Native Support of Multi-tenancy in RDBMS for Software as a Service", In Proceedings of the 14th International Conference on Extending Database Technology, Mar. 21, 2011, pp. 117-128.

"Final Office Action Issued in U.S. Appl. No. 15/249,554", dated Aug. 27, 2018, 19 Pages.

"MySQL Proxy", https://downloads.mysql.com/docs/mysql-proxy-en.pdf, Published on: Oct. 8, 2008, 54 pages.

"MaxScale as a replication proxy", https://mariadb.com/kb/en/mariadb-enterprise/mariadb-maxscale-14/maxscale-as-a-replication-proxy/, Retrieved on: Feb. 14, 2017, 7 pages.

"Proxy Authentication", https://docs.oracle.com/cd/B28359_01/java.111/b31224/proxya.htm, Published on: Jan. 10, 2012, 6 pages.

"Notice of Allowance Issued in U.S. Appl. No. 15/249,554", dated Jan. 17, 2019, 9 Pages.

"Non Final Office Action dated in U.S. Appl. No. 16/394,385", dated Oct. 10, 2019, 17 pages.

* cited by examiner

TRIGGER SYSTEM FOR DATABASES USING PROXY

CROSS-REFERENCE TO RELATED APPLICATIONS

The present application is related to U.S. patent application Ser. No. 15/249,554, filed on Aug. 29, 2016. The entire disclosure of the application referenced above is incorporated by reference.

FIELD

The present disclosure relates to database triggers for databases in distributed network systems.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In a distributed network system (e.g., of an enterprise), a plurality of entities such as client devices, servers, etc. communicate with each other and with one or more central servers over a network. For example, the distributed network system may provide distributed data storage, application hosting and processing, and other services to various remote or local entities. The distributed network system may correspond to a cloud-based computing system.

The distributed data storage may include one or more databases for storing application data, user data, etc. A database may be a shared database that is accessible (e.g., either directly or indirectly) to a large number of clients, including tenants (e.g., customers) and individual users associated with respective tenants. Databases may include, but are not limited to, standard query language (SQL) databases and NoSQL databases.

SUMMARY

A proxy module for monitoring modifications to a database and external to the database includes a query processing module to monitor traffic to and from the database. The traffic includes queries to the database. The query processing module is further to identify a query corresponding to a request to modify the database. A trigger event module is to generate a trigger event based on the request. The trigger event indicates a modification of the database associated with the request. The trigger event module is further to cause the trigger event to be communicated from the proxy module to at least one entity accessing the database.

A method for monitoring modifications to a database includes monitoring, external to the database, traffic to and from the database. The traffic includes queries to the database. The method further includes identifying a query corresponding to a request to modify the database, generating a trigger event based on the request, the trigger event indicating a modification of the database associated with the request, and causing the trigger event to be communicated to at least one entity accessing the database.

A trigger proxy system for monitoring modifications to a remote database includes memory, a processor, and a proxy trigger application stored in the memory and executable by the processor. The proxy trigger application is configured to monitor traffic to and from the remote database, the traffic including queries to the remote database, identify a query corresponding to a request to modify the remote database, generate a trigger event based on the request, the trigger event indicating a modification of the remote database associated with the request, and cause the trigger event to be communicated to at least one entity accessing the remote database.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Figure 2:
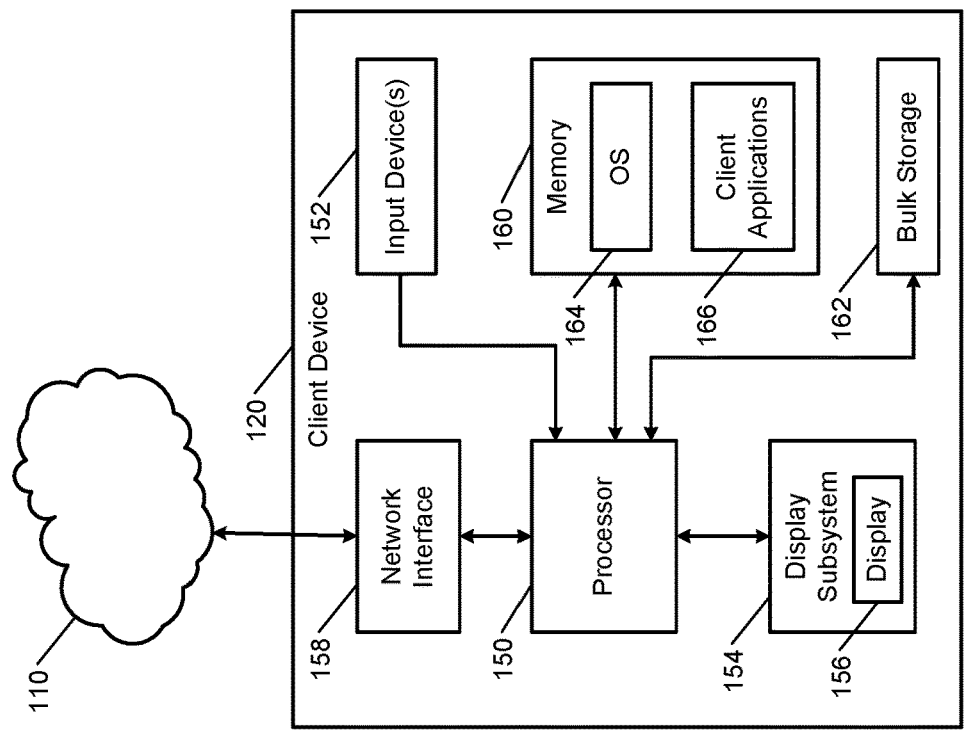
FIG. 2 is an example client device that implements proxy trigger systems and methods according to the principles of the present disclosure.

Some types of databases (e.g., relational database management systems) in distributed network systems implement an internal database trigger system. Database triggers cause a database to automatically execute various procedures (e.g., scripts, processes, etc.) in response to certain events that modify content within the database. Events received from external entities may modify data (e.g., entries such as documents, rows, etc.) stored within the database, policy rules, process behavior, etc. Accordingly, the database may be configured to execute further procedures, update other stored data, etc. in response to certain events (e.g., a file within the database being modified may trigger a data loss prevention scan for that file). However, automatically executing scripts or other procedures within the database may cause further security, stability, and/or performance issues in the operation of the database.

Conversely, some types of databases (e.g., NoSQL databases) do not implement a trigger system. For example, a distributed network system may instead implement a polling system for applications to determine changes made to the database. In a polling system, applications may generate queries to the database to request updates regarding changes to the database. For example, polling may include polling policy rules tables, tenant tables, etc. associated with the database, Reducing polling frequency may result in unacceptable delays in providing updates to and from the database. Accordingly, the database may receive repeated queries from numerous entities, most of which may unnecessary, thereby consuming resources and degrading overall performance of the database.

Database trigger systems and methods according to the principles of the present disclosure implement an external trigger system. The trigger system provides a proxy module between entities accessing the database (e.g., client devices, other servers, applications, etc.) and the database. The proxy module monitors queries provided to the database and selectively generates triggers based on each query. For example, the proxy module may generate a trigger based on a modifiable definition of which parameters of a query constitute a trigger event. For each query, the proxy module generates a trigger that includes relevant details about the parameters of the query (e.g., a table name associated with the query, a field name associated with the query, query type, values that are queried and/or modified in response to the query, etc.). Triggers are then provided as events in a queue of a messaging module. An entity may access the queue to retrieve events relevant to that entity, and, in some examples, may configure the queue to conditionally provide certain types of events to the entity. Accordingly, the database trigger systems and methods described herein do not rely on an internal triggering mechanism of the database.

Below are simplistic examples of a distributed computing environment in which the systems and methods of the present disclosure can be implemented. Throughout the description, references to terms such as servers, client devices, applications and so on are for illustrative purposes only. The terms servers and client devices are to be understood broadly as representing computing devices comprising one or more processors and memory configured to execute machine readable instructions. The terms applications and computer programs are to be understood broadly as representing machine readable instructions executable by the computing devices.

Figure 1:
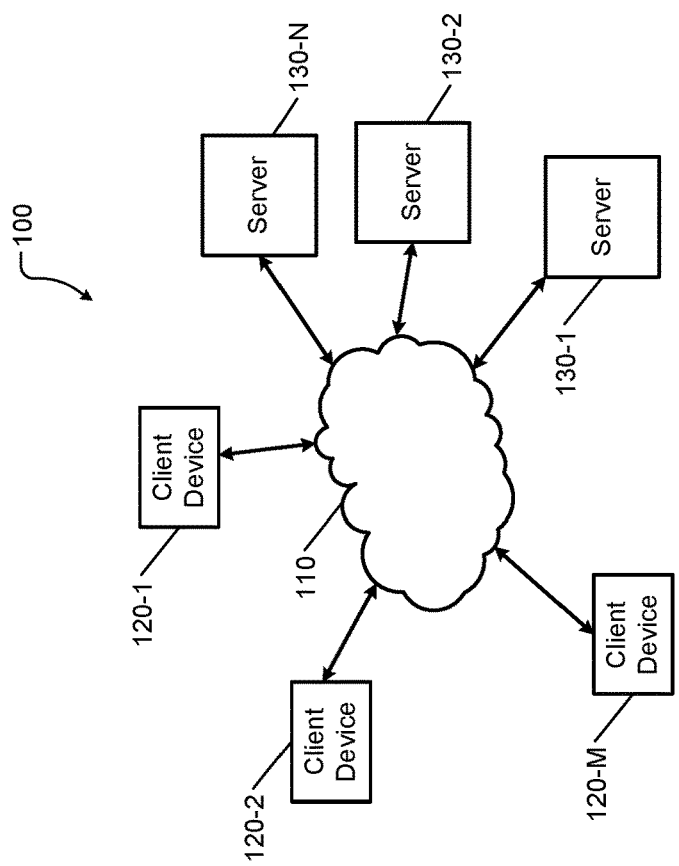
FIG. 1 is an example distributed network system that implements proxy trigger systems and methods according to the principles of the present disclosure.

FIG. 1 shows a simplified example of a distributed network system 100 of an enterprise. The distributed network system 100 includes a network 110, one or more client devices 120-1, 120-2, . . . , and 120-N (collectively client devices 120) (where N is an integer greater than or equal to one), and a server 130. The network 110 may include a local area network (LAN), a wide area network (WAN) such as the Internet, or other type of network (collectively shown as the network 110). While only one server is shown, the distributed network system 100 may include multiple servers. For example, the servers may be located at different departments and different geographical locations of the enterprise. The client devices 120 communicate with the server 130 via the network 110. The client devices 120 and the server 130 may connect to the network 110 using wireless and/or wired connections to the network 110.

For example, the client devices 120 may include smartphones, personal digital assistants (PDAs), laptop computers, personal computers (PCs), and so on. The server 130 may provide multiple services to the client devices 120. For example, the server 130 may execute a plurality of software applications developed by one or more vendors. The server 130 may host multiple databases that are utilized by the plurality of software applications and that are used by users of the client devices 120.

In addition, the server 130 implements a proxy trigger system according to the principles of the present disclosure. For example, the proxy trigger system includes hardware configured to execute an application for monitoring queries provided to a database and selectively generating triggers based on each query as described below in more detail.

FIG. 2 shows a simplified example of the client device 120. The client device 120 may typically include a central processing unit (CPU) or processor 150, one or more input devices 152 (e.g., a keypad, touchpad, mouse, and so on), a display subsystem 154 including a display 156, a network interface 158, a memory 160, and a bulk storage 162.

The network interface 158 connects the client device 120 to the distributed network system 100 via the network 110. For example, the network interface 158 may include a wired interface (e.g., an Ethernet interface) and/or a wireless interface (e.g., a Wi-Fi, Bluetooth, near field communication (NFC), or other wireless interface). The memory 160 may include volatile or nonvolatile memory, cache, or other type of memory. The bulk storage 162 may include flash memory, a hard disk drive (HDD), or other bulk storage device.

The processor 150 of the client device 120 executes an operating system (OS) 164 and one or more client applications 166. The client applications 166 include an application to connect the client device 120 to the server 130 via the network 110. The client device 120 accesses one or more applications executed by the server 130 via the network 110. In some examples, the client device 120 accesses the proxy trigger system implemented by the server 130. For example, the client device 120 may execute a client application 166 for requesting and receiving trigger events, registering to receive trigger events, etc. as described below in more detail.

Figure 3:
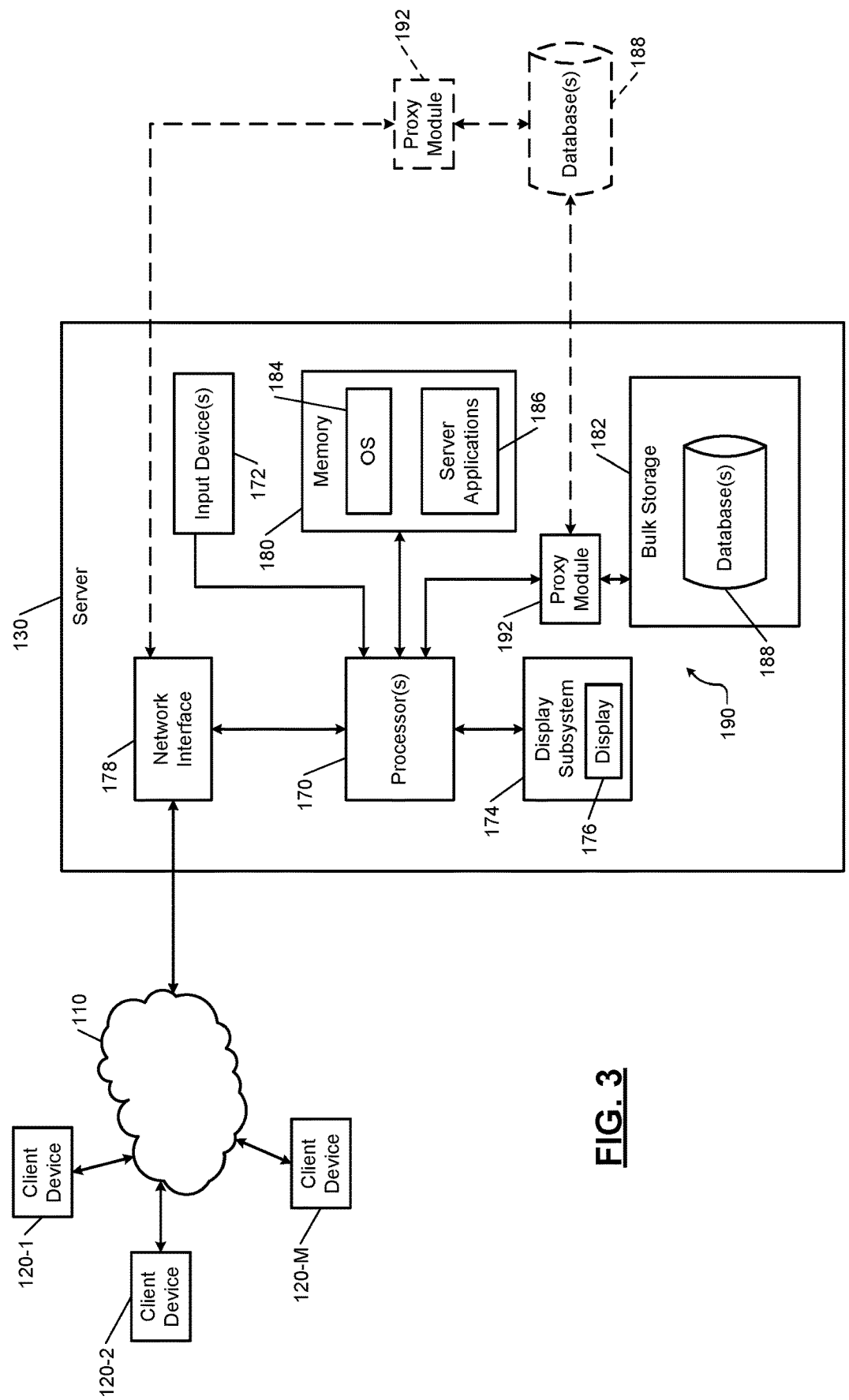
FIG. 3 is an example server that implements proxy trigger systems and methods according to the principles of the present disclosure.

FIG. 3 shows a simplified example of the server 130. The server 130 typically includes one or more CPUs or processors 170, one or more input devices 172 (e.g., a keypad, touchpad, mouse, and so on), a display subsystem 174 including a display 176, a network interface 178, a memory 180, and a bulk storage 182.

The network interface 178 connects the server 130 to the distributed network system 100 via the network 110. For example, the network interface 178 may include a wired interface (e.g., an Ethernet interface) and/or a wireless interface (e.g., a Wi-Fi, Bluetooth, near field communication (NFC), or other wireless interface). The memory 180 may include volatile or nonvolatile memory, cache, or other type of memory. The bulk storage 182 may include flash memory, one or more hard disk drives (HDDs), or other bulk storage device.

The processor 170 of the server 130 executes an operating system (OS) 184 and one or more server applications 186. The bulk storage 182 may store one or more databases 188 that store data structures used by the server applications 186 to perform respective functions.

The server applications 186 may include applications related to a proxy trigger system 190 of the present disclosure. For example, the proxy trigger system 190 may include a proxy module 192, and in some examples may include the database 188. The proxy module 192 and the database 188 may be located within the server 130 and/or external to the server 130 (e.g., in another server). In some examples, the proxy module 192 may be located within the server 130 while one or more of the databases 188 are located external to the server 130. The proxy module 192 may communicate directly with a database 188 external to the server 130 and/or may communicate with a database 188 external to the server 140 via the network interface 178, the network 110, etc. In other examples, the proxy trigger system 190 may include two or more proxy modules 192 distributed over two or more machines (e.g., one or more of the proxy modules 192 assigned to respective ones of a plurality of the servers 140), located on respective ones of the servers 140 and/or external to the servers 140, etc. Accordingly, the principles of the present disclosure are not limited to the arrangement of the proxy trigger system 190 as shown in FIG. 3.

Figure 4:
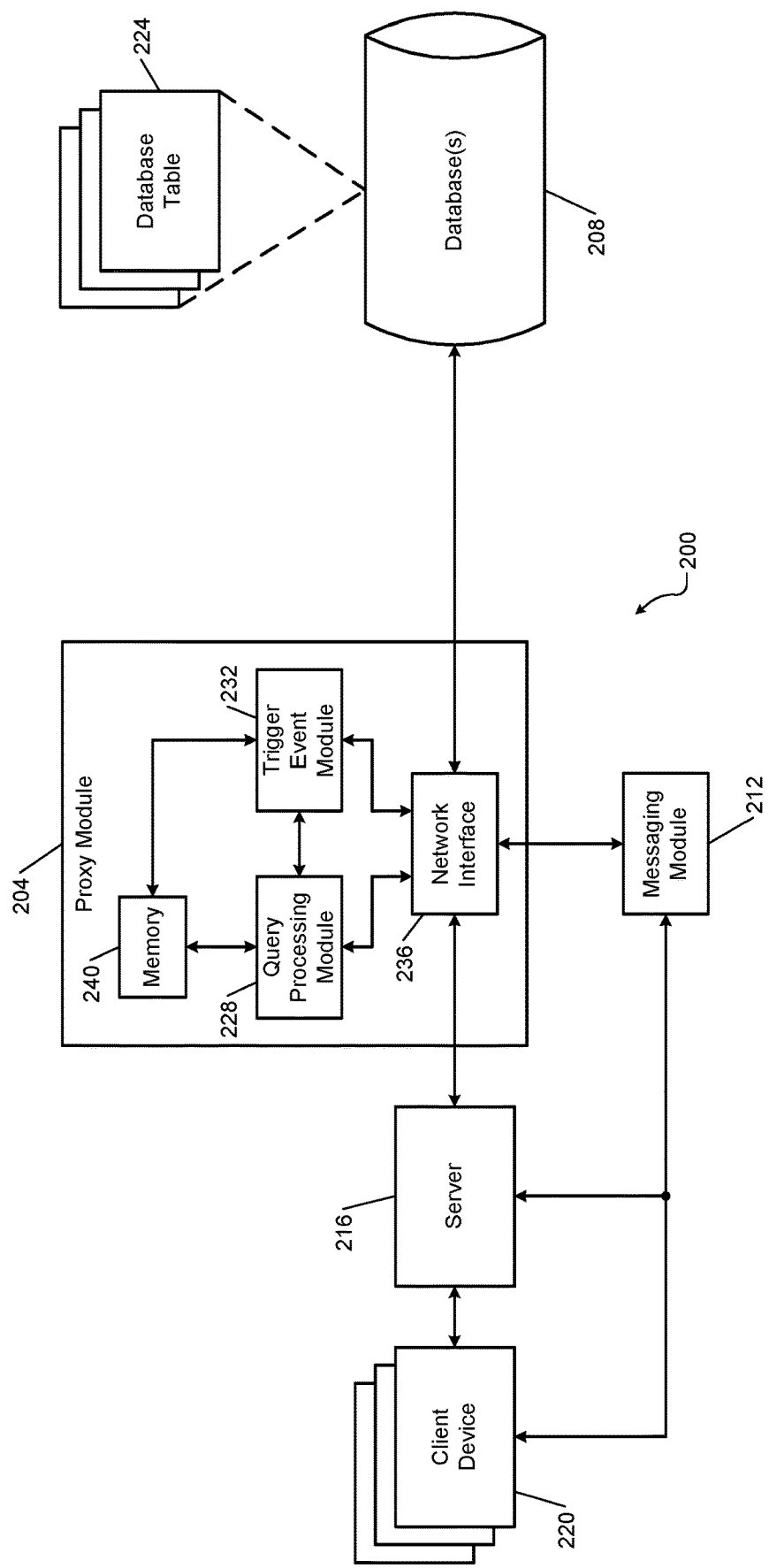
FIG. 4 is an example proxy trigger system according to the principles of the present disclosure.

FIG. 4 shows an example proxy trigger system 200 in more detail. The proxy trigger system 200 includes a proxy module 204, one or more databases 208, and a messaging module 212. The proxy module 204 is configured to monitor traffic between a server 216 and the database 208 (e.g., via client devices 220, the network 110, etc.). The traffic may include requests to access the database 208 and responses from the database 208, and may include, but are not limited to, requests to retrieve, store, and update entries in the database 208. One example of monitoring traffic between the server 216 and the database 208 using a proxy is described in U.S. patent application Ser. No. 15/249,554, entitled Cross-Tenant Data Leakage Isolation, and filed on Aug. 29, 2016, the entire disclosure of which is incorporated herein.

For example, the database 208 maintains data corresponding to a plurality of different tenants, clients, etc. Accordingly, users associated with different tenants and clients (e.g., corresponding to the server 216, the client devices 220, etc.) may access the database 208 to retrieve data, store data, update data, etc. For example only, the database 208 may correspond to a table-based relational database structure or non-relational database, such as a NoSQL database.

In some examples, the data in the database 208 is organized according to a database schema. A database schema, which may be relational or dynamic, is a structure that represents a logical view of the database 208. The database schema defines how data is organized and how relationships between the data are associated, and defines constraints that are applied to the data. In some examples, the database 208 implements the database schema as one or more database tables 224. For example, the database tables 224 may include tables including, but not limited to, tenant tables identifying file names and associated information (e.g., file size, creating date, modification date, associated process or services, etc.) for respective tenants, a policy rules table, etc.

A policy rules table includes a plurality of policy rule entries associated with respective processes. In other words, each policy rule entry indicates one or more processes that are executed to enforce a respective policy. For example, a policy may be associated with actions linked to particular data stored in the database 208, such changes made to user data, control data, client or tenant information, etc. Accordingly, processes associated with each policy rule entry are executed in response to certain actions.

In some examples, queries from the server 216 may include requests to modify data (e.g., entries including, but not limited to, documents, rows, policy rules, etc.) in the database 208, including data associated with one or more of the database tables 224. For example, the requests may include requests from one of a plurality of entities (e.g., clients, tenants, etc.) to modify a policy rule, add a new policy rule, delete an existing policy rule, etc. Others of the plurality of entities may not be aware of the corresponding modification of the database tables 224 without, for example, polling the tables 224 as described above. Accordingly, the proxy module 204 is further configured to monitor the traffic to identify queries and selectively generate a trigger event based on the queries. The proxy module 204 provides the trigger event to the messaging module 212, which selectively provides the trigger events to the server 126, the client devices 220, etc.

The proxy module may include a query processing module 228 and a trigger event module 232. The query processing module 228 monitors traffic communicated between the server 216 and the database 208 (e.g., via network interface 236) to identify queries that may require a trigger event. For example, requests to access the database 208 typically include information (e.g., in a header) indicating characteristics of the request, including, but not limited to, a request identifier, an identifier of a target database 224, a type of expected response from the database 208, a type of the request (e.g., an action to be performed, such as an addition, deletion, or update of a document or policy rule entry) a length of the request, etc. The query processing module 228 parses the information contained in the request and, based on the parsed information, selectively provides requests requiring a trigger event to the trigger event module 232.

For example, the query processing module 228 identifies requests requiring trigger events according to information such as the type of the request. In some examples, the query processing module 228 determines that any request to insert, delete, or update/modify a document or policy rule entry requires a trigger event and provides the request to the trigger event module 232 accordingly.

The trigger event module 232 generates trigger events based on the requests received from the query processing module 228. For example, a trigger event may include information including, but not limited to, an identifier of the document or policy rule entry that was modified by the request, an identifier of the associated database table 224, an identifier of a tenant, client, etc. that generated the request, a type of event that was requested (e.g., addition/insertion, update, or deletion of a document or policy rule entry), a timestamp, etc. In some examples, the trigger event may include a payload field. The payload field may include, for example, any additional information inserted by the entity that generated the request and/or information inserted by the proxy module 204. For example, the payload field may include the actual request provided to the database 208.

The messaging module 212 receives the trigger events and provides the trigger events to selected entities, including, but not limited to, the server 216 (and/or other servers), one or more of the client devices 220, etc. The messaging module 212 may communicate trigger events directly to the server 216 and the client devices 220 (via the network 110) and/or via the network interface 236 of the proxy module 204. For example, the messaging module 212 may implement a queue that stores trigger events received from the proxy module 204. In some examples, the messaging module 212 sequentially provides the trigger events received and stored in the queue to each entity associated with the database 208. Entities (the client devices 220, the server 216, etc.) may register with the messaging module 212. The messaging module 212 may store a list of entities registered with the messaging module 212 and provide all trigger events to registered entities. In other examples, entities may register with the messaging module 212 to receive only selected trigger events. For example, an entity may request only trigger events associated with selected documents or policy rule entries, selected database tables 224, selected types of modifications, etc. Accordingly, the messaging module 212 may also store an indication of which type of trigger events (e.g., for a specific table, collection, type of operation, etc.) to provide to each entity registered with the messaging module 212. In some examples, the trigger event module 232 and/or the messaging module 212 may aggregate multiple changes to the database 208 into a single trigger event. In still other examples, entities may selectively provide requests to the messaging module 212 to retrieve one or more trigger events. Accordingly, an amount of unnecessary data transmission may be reduced, increasing the overall performance and efficiency of the proxy trigger system 200 and the database 208.

For some requests, the trigger event module 232 generates a trigger event in response to receiving the request from the query processing module 228. For other requests, the trigger event module 232 may generate a trigger event when a response to the request is received from the database 208. For example, the query processing module 228 may monitor responses from the database 208 to identify a response that indicates that the database 208 performed a corresponding modification (e.g., of a document or policy rule entry in the database tables 224). The query processing module 228 notifies the trigger event module 232 that the response indicating that the request was processed by the database 208 was received. Accordingly, the trigger event module 232 may be configured to generate trigger events for some requests upon receiving the requests at the proxy module 204, while only generating trigger events for other events upon receiving acknowledgment or confirmation, from the database 208, that a modification was performed in response to the request.

In some examples, requests received by the proxy module 204 may include information (e.g., a flag) indicating whether a trigger event should be generated in response to the response or in response to the acknowledgment from the database 208 that the modification was performed. In other examples, the query processing module 228 may be configured to modify the requests provided to the trigger event module 232 to indicate whether a trigger event should be generated in response to the response or in response to the acknowledgment from the database 208. In still other examples, the trigger event module 232 may generate a trigger event and provide the trigger event to the messaging module 212 upon receiving a request from the query processing module 228, but the messaging module 212 delays transmitting the trigger event (or making the trigger event available for retrievable) until the acknowledgment is received from the database 208. The trigger event may include an indication of whether the trigger event was generated in response to the request or in response to the acknowledgment received from the database 208.

For example only, the query processing module 228, the trigger event module 232, and/or the messaging module 212 may be implemented by a processor or other hardware configured to execute one or more applications (e.g., stored in memory 240) for monitoring and parsing queries, identifying requests requiring a trigger event, generating trigger events, transmitting trigger events, etc. described above. In some examples, the query processing module 228 and the trigger event module 232 may be implemented by a same processor.

Figure 5:
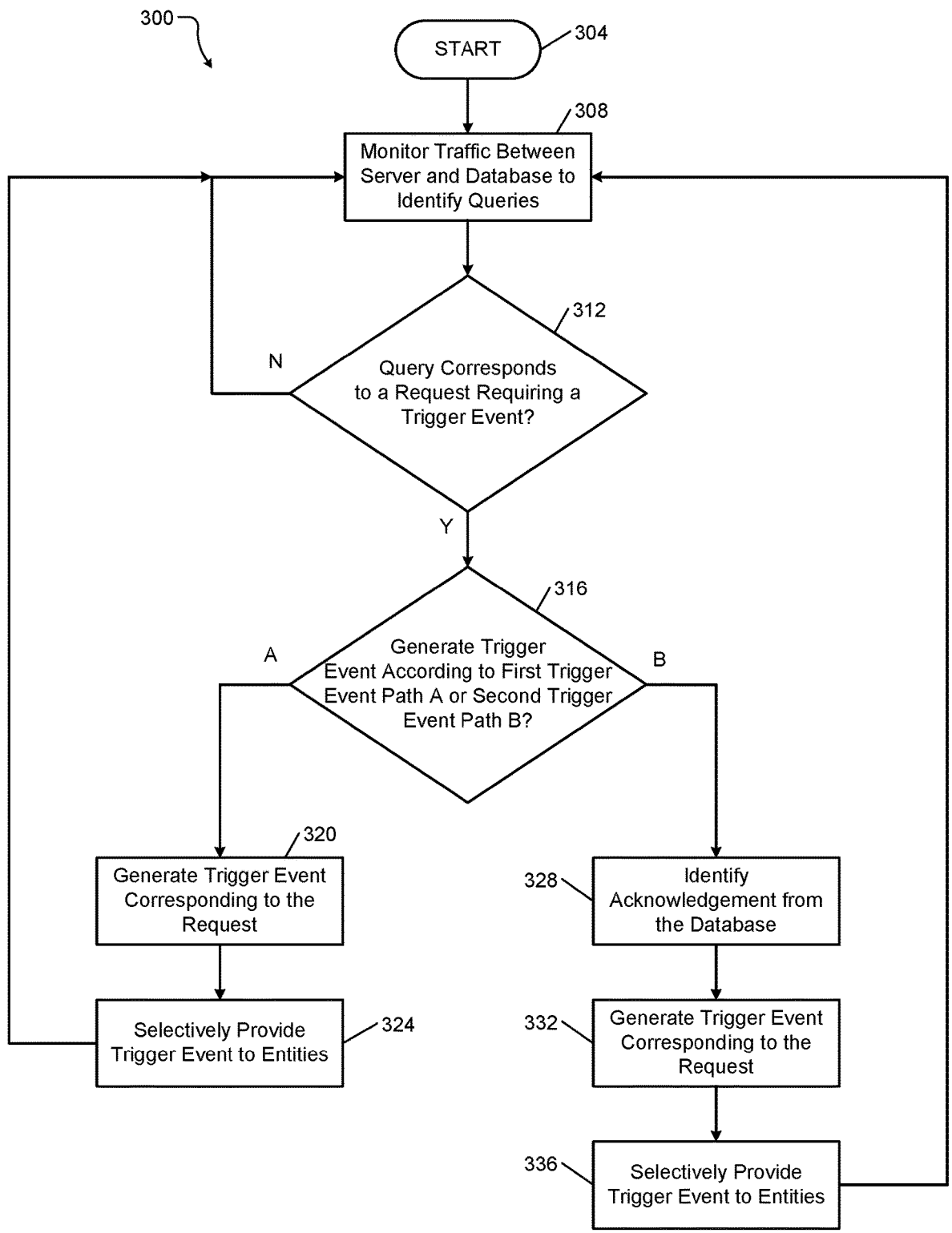
FIG. 5 is an example method for generating trigger events using a proxy according to the principles of the present disclosure.

Referring now to FIG. 5, an example method 300 for generating trigger events using a proxy begins at 304. At 308, the method 300 (e.g., the proxy module 204) monitors traffic to between the server 216 and the database 208 to identify queries. At 312, the method 300 (e.g., the query processing module 228) determines whether a query corresponds to a request requiring a trigger event. If true, the method 300 continues to 316. If false, the method 300 continues to 308.

At 316, the method 300 (e.g., the trigger event module 232) determines whether to generate a trigger event in response to receiving the request (in a first trigger event path A) or in response to receiving an acknowledgement from the database 208 that a modification was made based on the request (in a second trigger event path B).

In the first trigger event path A, the method 300 (e.g., the trigger event module 232) generates a trigger event corresponding to the request at 320. At 324, the method 300 (e.g., the messaging module 212) selectively provides the trigger event to one or more entities and continues to 308.

In the second trigger event path B, the method 300 (e.g., the query processing module 228 identifies an acknowledgement from the database 208 associated with the request at 328. At 332, the method 300 (e.g., the trigger event module 232) generates a trigger event corresponding to the request. At 336, the method 300 (e.g., the messaging module 212) selectively provides the trigger event to one or more entities and continues to 308.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

The term memory is a subset of the term computer-readable medium or machine-readable medium. The term computer-readable medium or machine-readable medium, as used herein, does not encompass transitory electrical or electromagnetic signals propagating through a medium (such as on a carrier wave); the term computer-readable medium or machine-readable medium may therefore be considered tangible and non-transitory. Non-limiting examples of a non-transitory, tangible computer-readable medium or machine-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A computer system comprising:
    at least one processor; and
    at least one computer-readable medium having stored thereon machine readable instructions that are executable by the at least one processor to implement a proxy that is positioned between one or more clients and a database, implementing the proxy including at least:
        monitoring traffic to and from the database, including monitoring one or more queries to the database from the one or more clients, and monitoring one or more corresponding responses from the database to the one or more clients;
        based on monitoring the traffic to and from the database, identifying at least one of:
            a query from a client of the one or more clients to the database corresponding to a request to modify the database; or
            a response from the database to the client that indicates that the database performed a modification of the database associated with the request;
        based on the request being a request to modify the database, or based on the response indicating that the database performed the modification, determining that the request requires a triggering event;
        generating the trigger event based on the request, the trigger event indicating the modification of the database associated with the request; and
        causing the trigger event to be communicated to at least one client of the one or more clients.

2. The computer system of claim 1, wherein the request to modify the database includes a request to at least one of insert, delete, or update data in the database.

3. The computer system of claim 1, wherein the request to modify the database includes a request to modify at least one of a document or a row stored in the database.

4. The computer system of claim 1, wherein the request to modify the database includes a request to modify a database table associated with the database.

5. The computer system of claim 1, wherein implementing the proxy includes the identifying the response from the database to the client that indicates that the database performed the modification of the database associated with the request, and wherein generating the trigger event comprises generating a trigger event that includes at least one of:
    an identifier of a document modified by the request,
    an identifier of a row modified by the request,
    an identifier of a database table modified by the request,
    an identifier of the database, or
    a type of modification associated with the request.

6. The computer system of claim 1, wherein implementing the proxy includes identifying the response from the database to the client that indicates that the database performed the modification of the database associated with the request, and wherein generating the trigger event comprises generating a trigger event that includes an indication that the trigger event was generated in response to the trigger event module receiving an acknowledgment from the database that the modification was made to the database based on the request.

7. The computer system of claim 1, wherein the proxy selectively communicates the trigger event to the at least one of the one or more clients.

8. The computer system of claim 7, wherein selectively communicating the trigger event to the at least one client is based on a list of registered entities.

9. The computer system of claim 8, wherein selectively communicating the trigger event to the at least one client is based on an indication of which type of trigger events to provide each registered entity.

10. The computer system of claim 7, wherein selectively communicating the trigger event to the at least one client is in response to the request having been received from the at least one client.

11. The computer system of claim 1, wherein implementing the proxy includes the identifying the query from the client to the database corresponding to the request to modify the database.

12. The computer system of claim 1, wherein causing the trigger event to be communicated to at least one client of the one or more clients comprises causing the trigger event to be communicated to a plurality of clients.

13. The computer system of claim 1, wherein generating the trigger event comprises aggregating a plurality of modifications to the database into a single trigger event.

14. A method for triggering based on modifications to a database, the method comprising:
monitoring, external to the database, traffic to and from the database, including monitoring one or more queries to the database from one or more clients of the database, and monitoring one or more corresponding responses from the database to the one or more clients;
based on monitoring the traffic to and from the database, identifying at least one of:
a query from a client of the one or more clients to the database corresponding to a request to modify the database; or
a response from the database to the client that indicates that the database performed a modification of the database associated with the request;
based on the request being a request to modify the database, or based on the response indicating that the database performed the modification, determining that the request requires a triggering event;
generating a trigger event based on the request, the trigger event indicating the modification of the database associated with the request; and
causing the trigger event to be communicated to at least one client of the one or more clients.

15. The method of claim 14, wherein the request to modify the database includes a request to at least one of insert, delete, or update data in the database.

16. The method of claim 14, wherein the request to modify the database includes a request to modify at least one of a document or a row stored in the database.

17. The method of claim 14, wherein the request to modify the database includes a request to modify a database table associated with the database.

18. The method of claim 14, wherein the method comprises the identifying the response from the database to the client that indicates that the database performed the modification of the database associated with the request, and wherein generating the trigger event comprises generating a trigger event that includes at least one of:
an identifier of a document modified by the request,
an identifier of a policy rule modified by the request,
an identifier of a database table modified by the request,
an identifier of the database,
a type of modification associated with the request, or
an indication that the trigger event was generated in response to receiving an acknowledgment from the database that the modification was made to the database based on the request.

19. The method of claim 14, wherein communicating the trigger event includes selectively communicating the trigger event based on at least one of a list of entities registered to receive trigger events or a request received from the at least one client.

20. A computer program product comprising one or more hardware storage devices having stored thereon machine readable instructions that are executable by at least one processor to implement a proxy that is positioned between one or more clients and a database, implementing the proxy including at least:
monitoring traffic to and from the database, including monitoring one or more queries to the database from the one or more clients, and monitoring one or more corresponding responses from the database to the one or more clients;
based on monitoring the traffic to and from the database, identifying at least one of:
a query from a client of the one or more clients to the database corresponding to a request to modify the database; or
a response from the database to the client that indicates that the database performed a modification of the database associated with the request;
based on the request being a request to modify the database, or based on the response indicating that the database performed the modification, determining that the request requires a triggering event;
generating the trigger event based on the request, the trigger event indicating the modification of the database associated with the request; and
causing the trigger event to be communicated to at least one client of the one or more clients.

* * * * *